US012587558B2

(12) United States Patent
Qiu et al.

(10) Patent No.: US 12,587,558 B2
(45) Date of Patent: Mar. 24, 2026

(54) SYSTEM AND METHOD OF ARTIFICIAL INTELLIGENCE ASSISTED CYBER THREAT IDENTIFICATION VIA WEBSERVER LOGS

(71) Applicant: Robert Bosch GmbH, Stuttgart (DE)

(72) Inventors: Chen Qiu, Pittsburgh, PA (US); Wan-Yi Lin, Wexford, PA (US); Filipe J. Cabrita Condessa, Pittsburgh, PA (US)

(73) Assignee: Robert Bosch GmbH (DE)

( * ) Notice: Subject to any disclaimer, the term of this patent is extended or adjusted under 35 U.S.C. 154(b) by 68 days.

(21) Appl. No.: 18/647,627

(22) Filed: Apr. 26, 2024

(65) Prior Publication Data

US 2025/0337761 A1 Oct. 30, 2025

(51) Int. Cl.
*H04L 9/40* (2022.01)

(52) U.S. Cl.
CPC ...... *H04L 63/1425* (2013.01); *H04L 63/1416* (2013.01)

(58) Field of Classification Search
CPC ........................ H04L 63/1425; H04L 63/1416
See application file for complete search history.

(56) References Cited

U.S. PATENT DOCUMENTS

| | | | | |
|---|---|---|---|---|
| 11,488,041 | B2 | 11/2022 | Mehta et al. | |
| 2009/0077663 | A1* | 3/2009 | Sun | H04L 63/1416 726/23 |
| 2021/0044607 | A1* | 2/2021 | Seki | H04L 41/069 |
| 2021/0287081 | A1* | 9/2021 | Saito | G06N 20/00 |
| 2025/0247408 | A1* | 7/2025 | Bubshait | H04L 63/1425 |
| 2025/0258667 | A1* | 8/2025 | Champanerkar | G06F 8/4435 |

OTHER PUBLICATIONS

Tang, Ruming, et al. "Zerowall: Detecting zero-day web attacks through encoder-decoder recurrent neural networks." IEEE INFOCOM 2020—IEEE Conference on Computer Communications. IEEE, 2020.

Hirakawa, Rin, Keitaro Tominaga, and Yoshihisa Nakatoh. "Software log anomaly detection through one class clustering of transformer encoder representation." HCI International 2020—Posters: 22nd International Conference, HCII 2020, Copenhagen, Denmark, Jul. 19-24, 2020, Proceedings, Part I 22. Springer International Publishing, 2020.

(Continued)

*Primary Examiner* — Anh Nguyen
(74) *Attorney, Agent, or Firm* — Dickinson Wright PLLC

(57) ABSTRACT

A system includes a controller configured to receive, at a trained transformer model, one or more run-time logs indicating information associated with interaction between a unique device and a server, output a user-score associated with the unique device and the one or more run-time logs in response to determining a negative log-likelihood of the one or more run-time logs in a next-log prediction probability distribution modeled by the trained transformer model, output a server-score utilizing at least normal-cluster centers associated with the trained transformer model and the one or more run-time logs, and in response to a sum of the user-score and server-score exceeding a threshold, outputting an indication of a cyber-threat associated with the one or more run-time logs.

20 Claims, 4 Drawing Sheets

(56) References Cited

OTHER PUBLICATIONS

Guo, Hongcheng, et al. "Translog: A unified transformer-based framework for log anomaly detection." arXiv preprint arXiv:2201.00016 (2021).
Vaswani, Ashish, et al. "Attention is all you need." Advances in neural information processing systems 30 (2017).
Ba, Jimmy Lei, Jamie Ryan Kiros, and Geoffrey E. Hinton. "Layer normalization." arXiv preprint arXiv:1607.06450 (2016).
Shazeer, Noam. "Glu variants improve transformer." arXiv preprint arXiv:2002.05202 (2020).
MacQueen, James. "Some methods for classification and analysis of multivariate observations." Proceedings of the fifth Berkeley symposium on mathematical statistics and probability. vol. 1. No. 14. 1967.

* cited by examiner

SYSTEM AND METHOD OF ARTIFICIAL INTELLIGENCE ASSISTED CYBER THREAT IDENTIFICATION VIA WEBSERVER LOGS

TECHNICAL FIELD

The present disclosure relates to web server logs that may utilize machine learning models. In embodiments, the present disclosure may utilize a transformer model to identify a cyber-threat.

BACKGROUND

Systems may detect web attacks with an encoder-decoder recurrent neural network. If the reconstruction error for the encoder-decode model is high for an incoming http request, the http request may be detected as a web attack. Some prior art systems utilize a transformer model to map all normal logs to a center in the embedding space. If a log's embedding is far away from the center, it may be detected as an attack. Other system may train a transformer-based binary classifier for detecting a cyber-attack. The transformer may be pre-trained on text data, and then fine-tunes and labels logs as normal or abnormal logs.

SUMMARY

A first illustrative embodiment discloses a computer-implemented method that includes receiving one or more historical logs indicating information associated with interaction of a server, sending the one or more historical logs to the transformer model, generating, at the transformer model, one or more embedding vectors utilizing the one or more historical logs at an embedding layer of the transformer model, generating, at the transformer model, one or more positional embeddings associated with the time stamps of each of the one or more historical logs, generating, at the transformer model, one or more embedding vectors added with one or more positional embeddings, in response to sending the one or more embedding vectors to a self-attention module of the transformer model, outputting one or more dimensional-embedding vectors, in response to sending the one or more dimensional-embedding vectors to a linear layer and SoftMax function of the transformer model, outputting a predicted next-log probability, outputting a trained transformer model in response to the predicted next-log probability indicating convergence, receiving one or more run-time logs indicating information associated with interaction between a unique device and the server, outputting a user-score associated with the device and the one or more run-time logs in response to determining a negative log-likelihood of the one or more run-time logs in the next-log prediction probability distribution modeled by the trained transformer model, outputting a server-score utilizing at least normal-cluster centers associated with the trained transformer model and the one or more run-time logs, and in response to a sum of the user-score and server-score exceeding a threshold, outputting an indication of a cyber-threat associated with the one or more run-time logs.

A second illustrative embodiment discloses, a system includes a controller configured to receive, at a trained transformer model, one or more run-time logs indicating information associated with interaction between a unique device and a server, output a user-score associated with the unique device and the one or more run-time logs in response to determining a negative log-likelihood of the one or more run-time logs in a next-log prediction probability distribution modeled by the trained transformer model, output a server-score utilizing at least normal-cluster centers associated with the trained transformer model and the one or more run-time logs, and in response to a sum of the user-score and server-score exceeding a threshold, outputting an indication of a cyber-threat associated with the one or more run-time logs.

A third illustrative embodiment discloses, a system includes one or more controllers configured to receive one or more historical logs indicating information associated with interaction of a server, send the one or more historical logs to the transformer model, generate, at the transformer model, one or more embedding vectors utilizing the one or more historical logs at an embedding layer of the transformer model, generate, at the transformer model, one or more positional embeddings associated with the time stamps of each of the one or more historical logs, generate, at the transformer model, one or more embedding vectors added with one or more positional embeddings, in response to sending the one or more embedding vectors to a self-attention module of the transformer model, output one or more dimensional-embedding vectors, in response to sending the one or more dimensional-embedding vectors to a linear layer and SoftMax function of the transformer model, output a predicted next-log probability, output a trained transformer model in response to the predicted next-log probability indicating convergence, receive one or more run-time logs indicating information associated with interaction between a unique device and the server, output a user-score associated with the device and the one or more run-time logs in response to determining a negative log-likelihood of the one or more run-time logs in the next-log prediction probability distribution modeled by the trained transformer model, output a server-score utilizing at least normal-cluster centers associated with the trained transformer model and the one or more run-time logs, and in response to a sum of the user-score and server-score exceeding a threshold, output an indication of a cyber-threat associated with the one or more run-time logs.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

In one embodiment, the system may learn the model in a self-supervised manner that doesn't require labeled normal and abnormal logs in training, which requires lower annotation effort than in prior systems. The present embodiments may identify the cyber threats by taking both the user access behavior and the knowledge of normal features in the server into account, and is therefore more sensitive to various types of attacks than in the prior art systems. In summary, some major contributions may involve (1) learning a transformer for cyber-threats identification in a self-supervised manner (2) proposing a novel score function for identifying cyber threats considering both the user access behavior and the knowledge of normal features in the server.

The various embodiments may be used to identify cyber threats in a webserver based on the logs. The webserver may contain logs from different users. Each user can create a sequence of logs when interacting with the server. The system may be given a set of log sequences $\mathcal{D}=\{X_1, \ldots, X_N\}$. A log sequence $X_i$ contains a series of logs $\{x_{i,1}, \ldots, x_{i,T}\}$ received at various time points belonging to the same user. The log $x_{i,t}$ contains both categorical values and numerical values. The task is to identify if the log $x_{i,t}$ is anomalous based on the received logs $x_{i,1:t}$ and the knowledge stored in the server. The system may consider an unsupervised learning setting and may not have label information in training.

Figure 1:
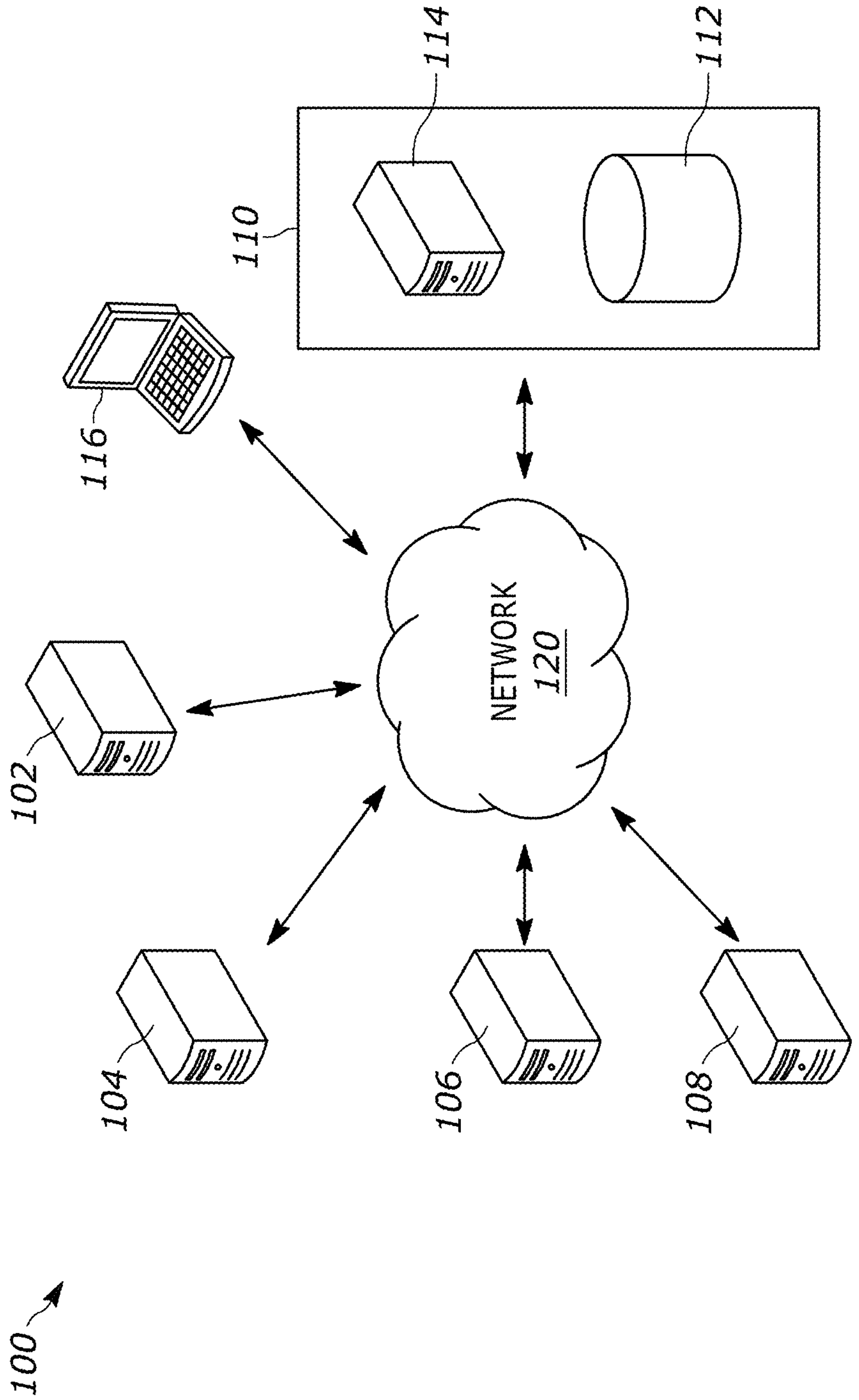
FIG. 1 is a diagram of an example of a system with a framework for query tasks according to an example embodiment of this disclosure.

FIG. 1 illustrates an illustrative embodiment of a web server system. The system 100 includes a web server 102 which is connected to a network 120. The web server 102 includes a central processing unit (CPU) and memory for storing instructions executable by the CPU. The web server 102 may be dedicated to supporting one or more software applications and delivering content associated with the software applications to various end users via the network 120. The web server 102 may be configured to serve content and to process client requests which it may do using the hypertext transfer protocol (HTTP), for example. The network 120 may comprise any one or more of the Internet, an intranet, a Local Area Network (LAN), a Wide Area Network (WAN), an Ethernet connection, a WiFi network, a Global System for Mobile Communication (GSM) link, a cellular phone network, a Global Positioning System (GPS) link, a satellite communications network, or other network, for example.

The system 100 may also include an application server 104 which is connected to the network 120. The application server 104 may include one or more CPUs and memory for storing instructions executable by the CPU. The application server 104 may be dedicated to supporting one or more software applications. The application server 104 may communicate with the web server 102 and may include logic for accessing, processing, and serving data based on requests received by the web server 102 or based on other requests from end users or servers. The end users may be remote to the network 120 and web server 102.

The system 100 may also include a backend database server 106 which is connected to the network 120 via various connection methods. The backend database server 106 includes a database which may store data used with the software applications and which may be supported by the web server 102 and the application server 104. The application server 104 may access the data stored in the backend database server 106 in response to requests received by the web server 102, for example.

In one embodiment, the system 100 includes an incident database server 108 which is connected to the network 120. The incident database server 108 may include information or a database which stores data concerning historical incidents occurring in the system. For example, the incident database server 108 may store incident tickets, where the incident tickets are submitted by application support teams in the event of an incident such as an outage or system failure. The incident tickets may be stored in table format in which the table contains a description of the incident ticket, an identification or name of the affected application, a symptom of the incident, and a resolution for the incident.

The system 100 may also include a processing center 110 that includes a log database 112 for receiving and storing logs and other data. In one embodiment, the system may include an incident prediction server 114 that predicts future incidents using an incident prediction engine in real time or near real time based on processed log data and historical log data. The log database 112 may be used to receive and store logs and other data from various sources, such as application logs, webserver logs, backend database logs, middleware logs, server health logs, etc. The log database may also store and process other types of data in addition to the log data useful for incident prediction according to the methods described herein. The processing center 110, including the log database 112 and the incident prediction server 114, may operate as a distributed file system in one embodiment. The distributed file system may utilize, for example, Hadoop Distributed File System (HDFS) protocol for distributing processing and storage requirements across one or more processing servers. In situations where the processing center 110 includes a very large number of processing servers, the processing center is capable of distributing tasks across a large number of hardware components, thereby making the processing center useful, for example, for processing very large amounts of data as may be generated by a large organization.

The processing center 110 thus can enable distributed processing of large datasets across clusters of computers. Although FIG. 1 shows the processing center 110 containing a single server 114 and database 112, it will be understood that multiple processors and databases are typically used in a distributed environment to process the large volumes of data.

The system 100 also includes one or more user terminals 116 which may comprise a desktop computer, laptop computer, tablet computer, smart phone, or other personal computer and which is connected to the network 120. The user terminal 116 includes a display on which a graphical user interface (GUI) is shown to a user. The user terminals may be identifiable based on a unique MAC address, IP address, user profile, or other information to allow for identification of a single user or device.

In the system 100, each of the web server 102, the application server 104, and the backend database server 106 may generate log entries in log files, where each log entry corresponds to certain server activity, according to one embodiment. The web server 102 generates log entries in log files which correspond to activity on the web server 102. The log entries may be based upon standard HTTP protocol, for example, which is used in web server technologies. Log entries generated by the web server 102 may include data for web user activity. Such web user activity data may include, for example, client IP address, server IP address, URL, user ID, bytes uploaded, bytes downloaded, HTTP code for each activity, etc. In general, such log entries may utilize a common format, although the format may differ slightly between log entries that may be generated by web servers running different technologies.

In one embodiment, the application server 104 may generate log entries in log files which correspond to activity on the application server 104. Log entries generated by the application server 104 are generally log entries corresponding to activity on the application server 104 other than web user activity. The log entries generated by the application server 104 may be business component log entries or backend services logs or logs generated by any other service called by the application, which is logging defined by developers according to their needs. As such, these logs may assume a variety of formats which may be dependent on the backend services used by the application.

The backend database server 106 also generates log entries in log files which correspond to activity on the backend database server 106. The log entries generated by the backend database server 106 may be based on technologies (such as IBM Websphere MQ or Apache Kafka) that are dependent on the particular server. In one embodiment, log entries may be maintained in statistics tables. They may be useful for recording information about data usage by software applications supported by the backend database server 106.

Figure 2:
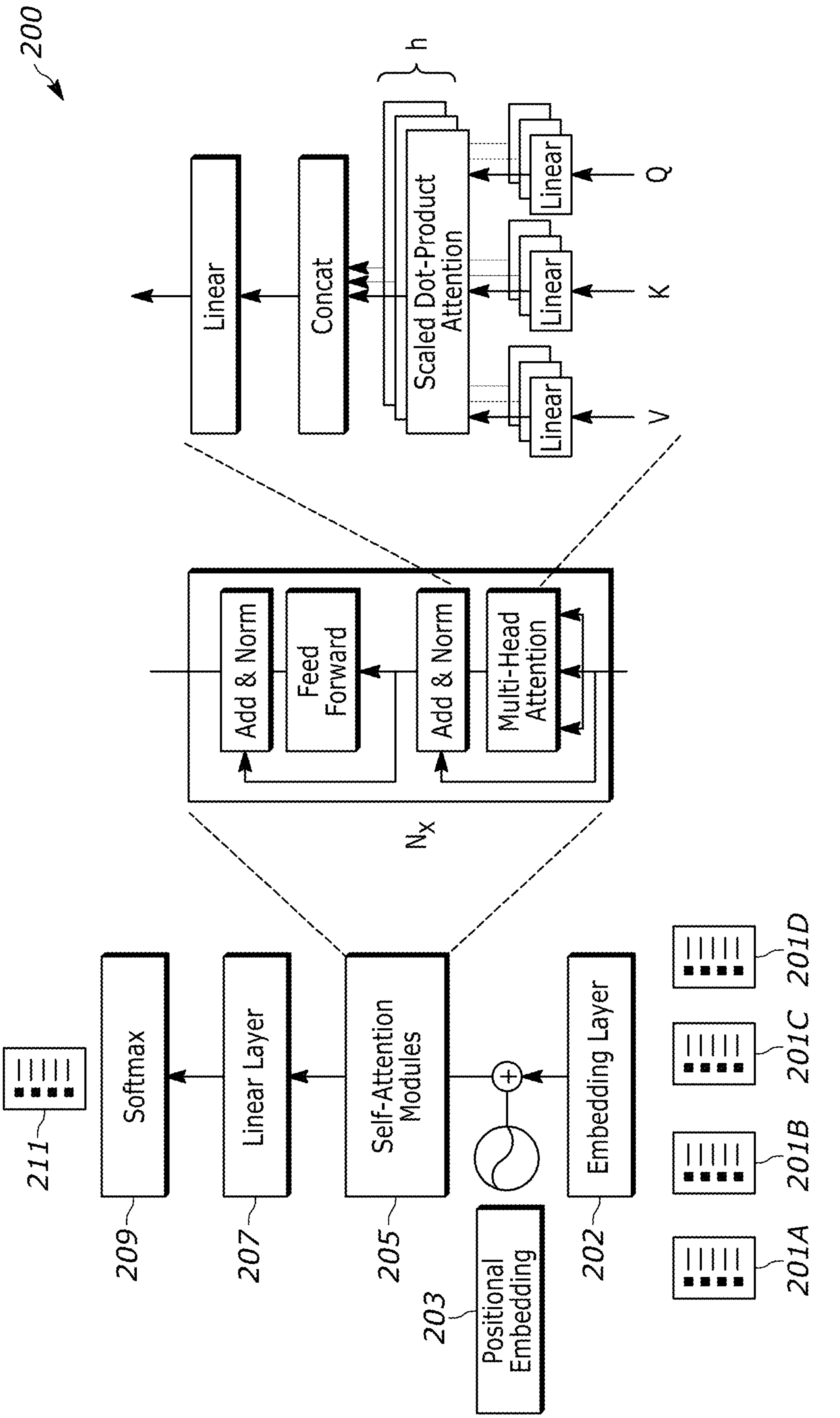
FIG. 2 is a conceptual diagram of an example of the framework for query tasks with respect to the machine learning system according to an example embodiment of this disclosure.

FIG. 2 is an illustrative embodiment of a transformer architecture according to one embodiment. The transformer architecture 200 may include an embedding layer 202, a positional embedding 203, one or more self-attention modules 205, and a linear layer 207. While the architecture may include a single or multiple components of the architecture, various embodiments can be contemplated that have either a single or multiple of a component. For example, a plurality of embedding layers may be utilized. It can also be contemplated that certain layers, components, and/or modules may not be utilized.

In one embodiment, the architecture 200 may include various layers. The system may include various historical logs 201A, 201B, 201C, 201D. The logs 201 may include information related to an interaction between a user or device and a web server. The logs may contain information about items downloaded, various pages/cites/files/documents accessed or downloaded, uploading of items, etc.

The architecture 200 may include an embedding layer 202. An embedding layer 202 may be one component in many natural language processing (NLP) and other machine learning models, particularly those that deal with text or categorical data. It may be used to convert categorical variables, such as words or characters, into dense vectors of real numbers, also known as embeddings.

The system may model the data patterns of the log sequences with a transformer, such as the one described above. At each time point, the transformer outputs the probability distribution of the next log $x_{i,t+1}$ given the past logs $x_{1,1:t}$, i.e, $p_\theta(x_{i,t+1}|x_{i,1:t})$.

Before feeding the log values to the self-attention modules 205, the system may embed them to embedding vectors $z\in \mathbb{R}^d$. The embedding layer 202 may include a lookup table that stores learnable embedding vectors with the dimension of d. In another embodiment, the embedding layer 202 may utilize a model (e.g. machine learning model) to identify or determine an embedding vector with a dimension. In summary, the upstream measurements $x_{i,1:t}$ may first be embedded to vectors $z^{0_{i,1:t}}$.

To inform the self-attention modules 205 the order of logs in the sequence, the system may add positional embeddings to the embeddings $z^{0_{i,1:t}}$ prior to entering the self-attention modules 205. The self-attention module 205 may include multi-head attention layer (with layer normalization and a feed-forward network composed of linear layers 207 with Gated Exponential Linear Units (GEGLU) activations. After passing through K self-attention modules, the system may generate embedding vectors $z^K_{i,1:t}$. The system may then use the linear layer 207 and SoftMax function 209 to convert the embedding vector $z^{K_t}$ to predicted next-log probabilities 211. The Softmax layer 209 may be a type of activation function commonly used in neural networks, particularly in the output layer of classification models. It may be used to convert the raw output of a neural network into a probability distribution over multiple classes.

The system and method may optimize the model parameters by maximizing log-likelihood of the predicted next-log probabilities over all time points and all training samples in $\mathcal{D}$. The loss may then be defined as:

$$L_{\mathcal{D}} = -\frac{1}{|\mathcal{D}|}\frac{1}{T-1}\sum_{i}^{|\mathcal{D}|}\sum_{t=1}^{T-1}\log p_\theta(x_{i,t+1}|x_{i,1:t})$$

The model may be framed upon the model parameters being optimized. In one embodiment, the system can obtain a representation of the log $x_{i,t}$ (along with its past logs) using the trained transformer as $z_{it}:=Z^K_{i,t}=f_t(x_{i,1:t})$. By running the transformer on all available normal logs in $\mathcal{D}$, we get a set of normal representations. Storing all normal representations requires a large memory. To manage the memory cost, we run a K-means clustering algorithm [7] to get M cluster centers $\{c_1, \ldots, c_M\}$ among the set of available normal representations. These M cluster centers $\{c_1, \ldots, c_M\}$ summarize the knowledge of normal features in the server.

The model may identify the cyber threats by evaluating and check two aspects of the logs and activities: (1) how well the received run-time log fits usual user access behavior and (2) how well the received log matches the knowledge of normal features in the server.

The transformer model learns the distribution of the user access behavior. So, we compute the negative log-likelihood of the log $x_{i,t}$ (of the user i received at time point t) under the model prediction distribution as $$s_{user}(x_{i,1:t}) = -\log p_\theta(x_{i,t}|x_{i,1:t-1}).$$

The stored normal cluster centers $\{c_1, \ldots, c_M\}$ represent the knowledge of normal features in the server. The system may compute a score based on the probability of the log $x_{i,t}$ matching the stored normal cluster centers, as shown below:

$$s_{server}(x_{i,1;t}) = \min_j s_{server,j}(x_{i,1;t}) \text{ where } s_{server,j} = -\log \frac{e^{-\|f_t(x_{i,1:t})-c_j\|^2}}{\sum_{k=1}^{M} e^{-\|f_t(x_{i,1:t})-c_k\|^2}}$$

If the representation of the received log is not similar to none of the stored normal cluster centers, the value of $x_{server}$ is high and then the received log is likely to be a cyber threat.

To take advantage of two scoring approaches, the system and method may combine them for identifying the cyber threats and have the combined score as $s(x_{i,1;t})=s_{user}(x_{i,1:t})+s_{server}(x_{i,1;t})$. If the score $s(x_{i,1;t})$ is larger than a defined threshold, the received log is identified as a cyber threat. The defined threshold may be defined manually by a user to identify the threat. In another embodiment, the threshold may be automatically generated by a model.

Figure 3:
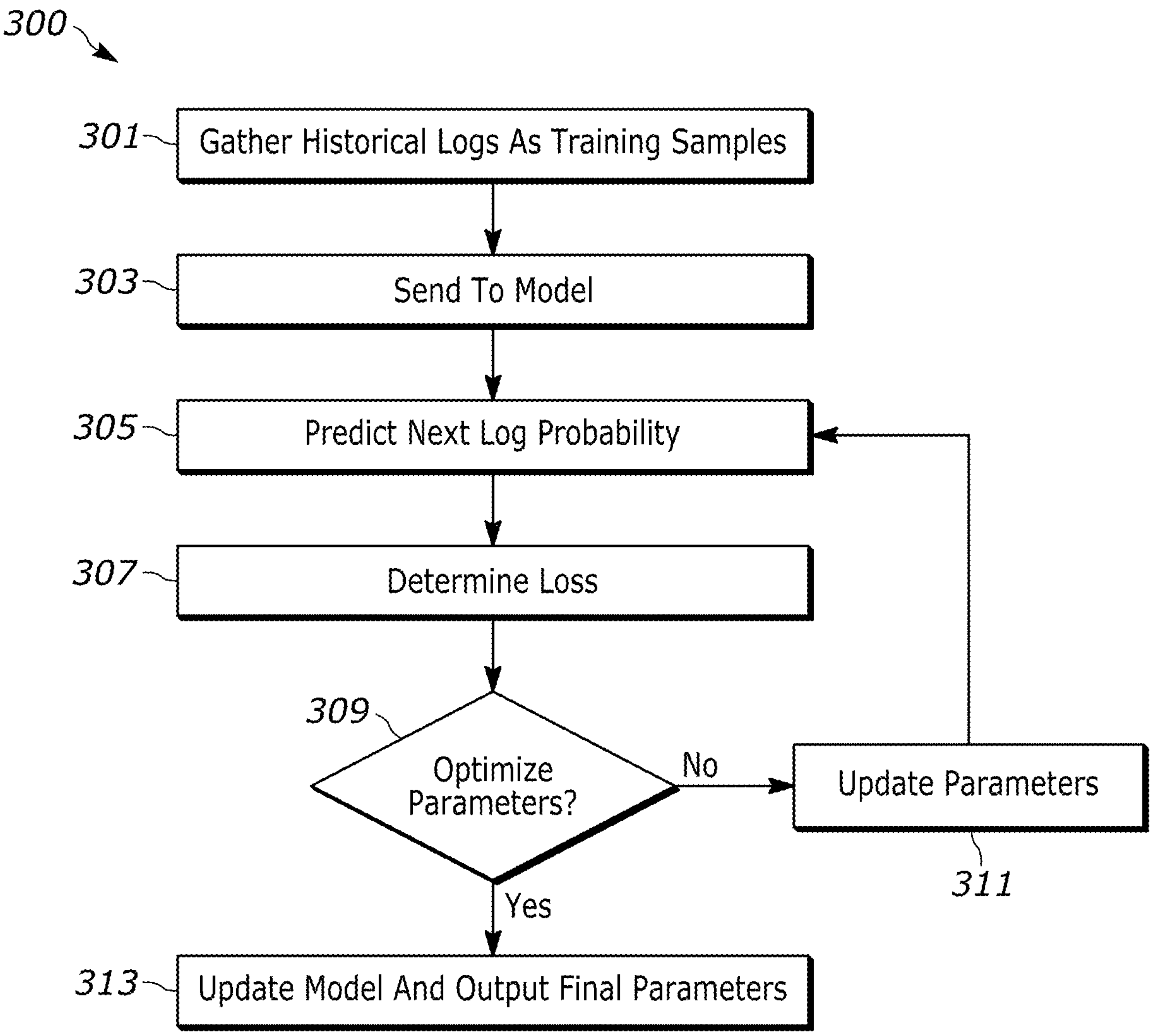
FIG. 3 illustrates a flow chart of an embodiment training a transformer model utilizing historical logs.

FIG. 3 illustrates an embodiment for training a model, such as a transformer architecture. At step 301, the system or method may gather historical logs. The historical logs may be utilized as a training sample. The historical logs may be utilized in a secure environment or other time of environment to ensure normal use-case scenarios without any indication of a normal operation that would result in a cyber-attack or other disruptive operation.

At step 303, the system may send the historical logs to the transformer model 403. As discussed above with respect to FIG. 2, the historical logs may be utilized to train the transformer model to identify a normal subset of operation for both the server and a particular user.

At step 305, the system may predict a next-log probability utilizing a predicted log. The system may predict the next-log probability. Thus, the system and method may utilize the trained transformer model to predict a next log that indicates an operation based on the historical logs.

At step 307, the system may compute a loss associated with next-log probability. The system and method compare the prediction as opposed to a real-time representation of the next interaction or log. The loss may be defined over a point in time by comparing the run-time logs to a prediction. As explained above, the loss may then be defined as:

$$L_{\mathcal{D}} = -\frac{1}{|\mathcal{D}|}\frac{1}{T-1}\sum_{i}^{|\mathcal{D}|}\sum_{t=1}^{T-1}\log p_\theta(x_{i,t+1}|x_{i,1:t})$$

At step 309, the system may determine if the current parameters are optimized for the transformer model. If the parameters are not optimized, the system and method may continue to run updated parameters until a certain sequence count or a threshold is met that may be utilized to identify a threshold. The threshold for a loss may be defined manually by a user or automatically. At step 311, the system may have to update new parameters and run another cycle if the loss has not been maximized by meeting the threshold. However, at step 313, the system may update the model with those parameters and set them as a final parameter of the model. Once the final parameters are set, the system may consider the model as a trained model.

Figure 4:
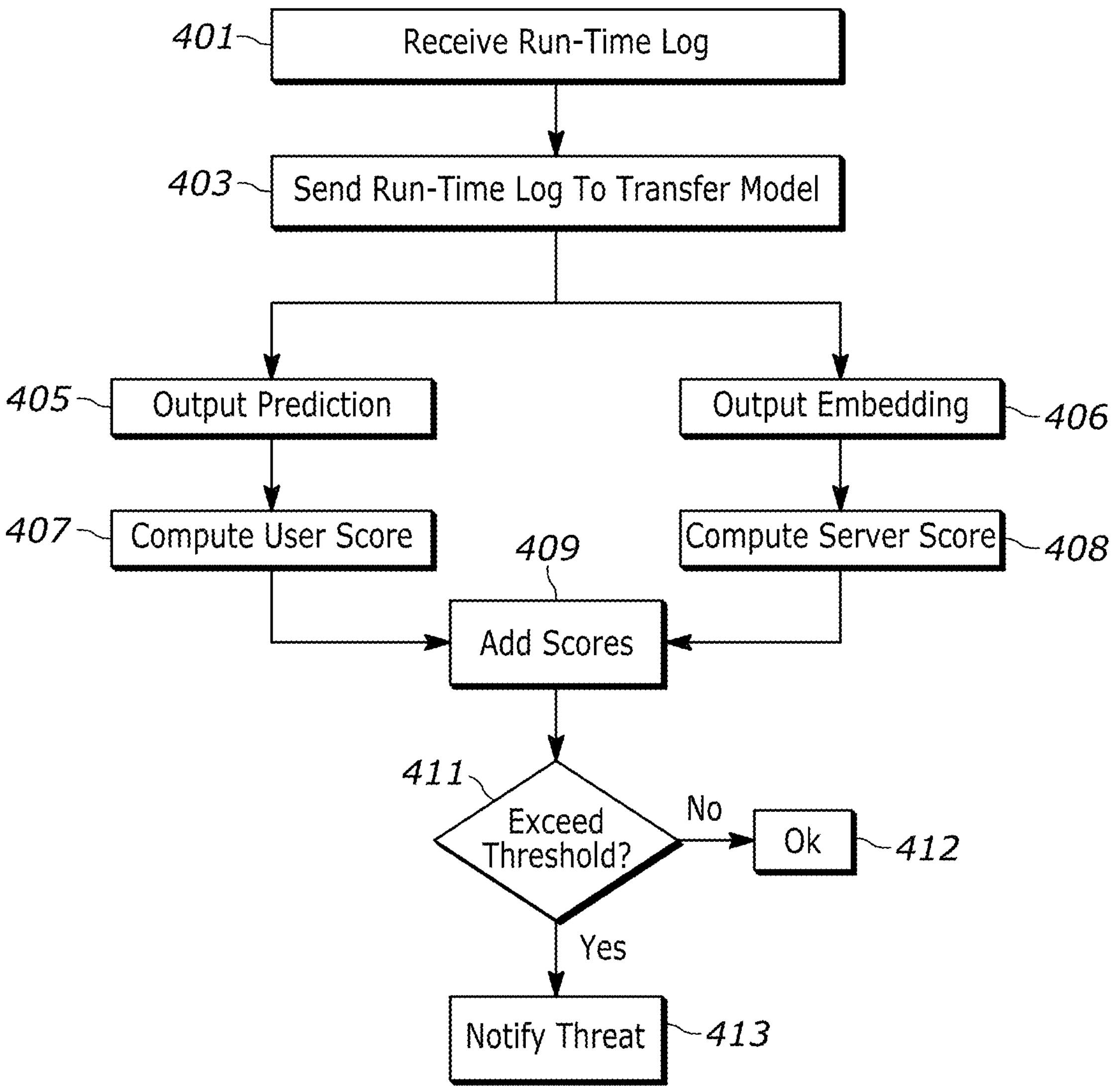
FIG. 4 illustrates a flow-chart of an embodiment identifying a cyber threat.

FIG. 4 illustrates a flow chart 400 of an embodiment utilized to identify a cyber threat. The system may receive one or more run-time logs 401 that is associated with the user. The run-time logs may include time stamps to indicate when the activity occurred. The run-time log may be done in a post-production or in an environment where the transformer model is already trained.

At step 403, the system may send the run-time log to a transformer model. The transformer model may be already trained. The run-time log may be sent to the model to output a prediction at 405. The prediction 405 may be utilized to determine the probability of the interaction that should occur next.

The model identifies the cyber threats by checking (1) how well the received log fits usual user access behavior and (2) how well the received log matches the knowledge of normal features in the server. At step 406, the system may output embeddings, as discussed in detail with respect to FIG. 2 above. The system may computer a user score at step 407. The user score 407 may indicate a probability of a specific user's interaction deviating from previous historical user behavior. The transformer model learns the distribution of the user access behavior. So, the system may compute the negative log-likelihood of the log $x_{i,t}$ (of the user i received at time point t) under the model prediction distribution as $$s_{user}(x_{i,1:t}) = -\log p_\theta(x_{i,t}|x_{i,1:t-1}).$$

The embeddings may be utilized to computer a sever score at step 408. The stored normal cluster centers $\{c_1, \ldots, c_M\}$ represent the knowledge of normal features in the server. The system may compute a score based on the probability of the log $x_{i,t}$ matching the stored normal cluster centers $$s_{server}(x_{i,1;t}) = \min_j s_{server,j}(x_{i,1;t}) \text{ where } s_{server,j} = -\log \frac{e^{-\|f_t(x_{i,1:t})-c_j\|^2}}{\sum_{k=1}^{M} e^{-\|f_t(x_{i,1:t})-c_k\|^2}}$$

At step 408, the system may compute the server score. If the representation of the received log is not similar to none of the stored normal cluster centers, the value of $s_{server}$ is high and then the received log is likely to be a cyber threat.

To take advantage of two scoring approaches, the system and method may combine them at step 409 for identifying the cyber threats and have the combined score as $s(x_{i,1;t}) =x_{user}(x_{i,1:t})+x_{server}(x_{i,1;t})$. If the score $s(x_{i,1;t})$ is below a threshold, it may be okay to proceed operation as normal as shown in step 412. If the score $s(x_{i,1;t})$ is larger than a defined threshold (at step 411), the received log is identified as a cyber threat at step 413. An alert or other notification may be output. The defined threshold may be defined manually by a user to identify the threat. In another embodiment, the threshold may be automatically generated by a model. The final score sums up the user score and the server score, and therefore is sensitive to various types of threats. For example, when an IP address is hijacked, its run-time log would not match its previous user behavior and then be identified by the user score. For a new user without enough historic logs, it may be difficult to identify the new user's run-time log with the user score. Instead, the system can rely on the server score for such a scenario. Also, a hacker may have plans to attack the system via a series of reasonable interactions with the server. It may be difficult to detect the threats based on the hacker's previous behavior. Instead, the system can rely on the server score which compares the run-time log with the stored normal behavior patterns in the memory.

In one embodiment, the user score evaluates if the run-time log of the user matches the user's past behavior dynamics. Thus, the system may identify behavior patterns from the user based on the log. A unique identifier may be tied to the various logs to allow the system to know how that user has previously operated. Thus, user-specific evaluation may be accomplished in an embodiment. In another embodiment, the server score may evaluate if the run-time log follows the usual normal behavior encountering in the server. Thus, historical logs of all user behavior is evaluated. The logs information may be compared to thus all activity on the server, not just personalized activity.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, case of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A computer-implemented method, comprising:

receiving one or more historical logs indicating information associated with interaction of a server;

sending the one or more historical logs to a transformer model;

generating, at the transformer model, one or more embedding vectors utilizing the one or more historical logs at an embedding layer of the transformer model;

generating, at the transformer model, one or more positional embeddings associated with one or more time stamps of each of the one or more historical logs;

generating, at the transformer model, the one or more embedding vectors added with one or more positional embeddings;

in response to sending the one or more embedding vectors to a self-attention module of the transformer model, outputting one or more dimensional-embedding vectors;

in response to sending the one or more dimensional-embedding vectors to a linear layer and SoftMax function of the transformer model, outputting a predicted next-log probability;

outputting a trained transformer model in response to the predicted next-log probability indicating convergence;

receiving one or more run-time logs indicating information associated with interaction between a unique device and the server;

outputting a user-score associated with the device and the one or more run-time logs in response to determining a negative log-likelihood of the one or more run-time logs in a next-log prediction probability distribution modeled by the trained transformer model;

outputting a server-score utilizing at least normal-cluster centers associated with the trained transformer model and the one or more run-time logs; and in response to a sum of the user-score and server-score exceeding a threshold, outputting an indication of a cyber-threat associated with the one or more run-time logs.

2. The method of claim 1, wherein the one or more historical logs indicating information associated with interaction between the device and the server includes downloaded content information, uploaded content information, search information, interaction information, and IP address information.

3. The method of claim 1, wherein generating, at the transformer model, the one or more embedding vectors includes utilizing a look-up table storing a learnable embedding vector associated with a log value of the one or more historical logs.

4. The method of claim 1, wherein the normal-cluster center associated with the trained transformer model is generated in response to a K-means clustering algorithm associated with the transformer model.

5. The method of claim 1, wherein the transformer model does not utilize labeled data.

6. The method of claim 1, wherein the self-attention module includes a feed-forward network.

7. The method of claim 1, wherein the one or more historical logs include logs from different users.

8. The method of claim 1, wherein the run-time logs includes both categorical values and numerical values.

9. The method of claim 1, wherein the trained transformer model is in a unsupervised learning setting.

10. The method of claim 1, wherein the embedding layer includes a look-up table storing embedding vectors with a dimension.

11. A computer system, comprising:

a processor in communication with a controller and configured to:

generate, at the transformer model, one or more embedding vectors utilizing the one or more run-time logs at an embedding layer of the transformer model;

generate, at the transformer model, one or more positional embeddings associated with the time stamps of each of the one or more run-time logs;

generate, at the transformer model, the one or more embedding vectors added with one or more positional embeddings;

in response to sending the one or more embedding vectors to a self-attention module of the transformer model, output one or more dimensional-embedding vectors;

in response to sending the one or more dimensional-embedding vectors to a linear layer and SoftMax function of the transformer model, output a predicted next-log probability;

output a trained transformer model in response to the predicted next-log probability exceeding a convergence threshold;

receive, at the trained transformer model, one or more run-time logs indicating information associated with interaction between a unique device and a server;

output a user-score associated with the unique device and one or more run-time logs in response to determining a negative log-likelihood of the one or more run-time logs in a next-log prediction probability distribution modeled by the trained transformer model;

output a server-score utilizing at least normal-cluster centers associated with the trained transformer model and the one or more run-time logs; and in response to a sum of the user-score and server-score exceeding a threshold, output an indication of a cyber-threat associated with the one or more run-time logs.

12. The computer system of claim 11, wherein the trained transformer model includes a SoftMax function, a linear layer, one or more self-attention modules, and an embedding layer.

13. The computer system of claim 11, wherein the transformer model does not utilize labeled data during training.

14. The computer system of claim 11, wherein the unique device is identifiable by an IP address or MAC address.

15. A computer system, comprising:

one or more processor in communication with one or more controllers configured to:

receive one or more historical logs indicating information associated with interaction of a server;

send the one or more historical logs to the transformer model;

generate, at the transformer model, one or more embedding vectors utilizing the one or more historical logs at an embedding layer of the transformer model;

generate, at the transformer model, one or more positional embeddings associated with the time stamps of each of the one or more historical logs;

generate, at the transformer model, the one or more embedding vectors added with one or more positional embeddings;

in response to sending the one or more embedding vectors to a self-attention module of the transformer model, output one or more dimensional-embedding vectors;

in response to sending the one or more dimensional-embedding vectors to a linear layer and SoftMax function of the transformer model, output a predicted next-log probability;

output a trained transformer model in response to the predicted next-log probability exceeding a convergence threshold;

receive one or more run-time logs indicating information associated with interaction between a unique device and the server;

output a user-score associated with the device and the one or more run-time logs in response to determining a negative log-likelihood of the one or more run-time logs in the next-log prediction probability distribution modeled by the trained transformer model;

output a server-score utilizing at least normal-cluster centers associated with the trained transformer model and the one or more run-time logs; and in response to a sum of the user-score and server-score exceeding a threshold, output an indication of a cyber-threat associated with the one or more run-time logs.

16. The computer system of claim 15, wherein the processor is further configured to run a K-means clustering algorithm to obtain one or more normal-cluster centers associated with the one or more historical logs.

17. The computer system of claim 15, wherein the transformer model does not utilize labels.

18. The computer system of claim 15, the run-time logs includes both categorical values and numerical values.

19. The computer system of claim 15, wherein the user-score includes data indicating whether the run-time log of a user matches previous behavior of the user.

20. The computer system of claim 15, wherein the one or more historical logs indicating information associated with interaction between the device and the server includes downloaded content information, uploaded content information, search information, interaction information, or IP address information.

* * * * *